US012503302B2

(12) United States Patent
Brimmo et al.

(10) Patent No.: US 12,503,302 B2
(45) Date of Patent: Dec. 23, 2025

(54) WASTE SORTING APPARATUS AND METHOD

(71) Applicant: CYCLED TECHNOLOGIES AS, Skien (NO)

(72) Inventors: Ayoola Brimmo, Skien (NO); Benedikt Pilscheur, Peissenberg (DE); Walid Glia, Abu Dhabi (AE)

(73) Assignee: CYCLED TECHNOLOGIES AS, Skien (NO)

( * ) Notice: Subject to any disclaimer, the term of this patent is extended or adjusted under 35 U.S.C. 154(b) by 0 days.

(21) Appl. No.: 18/719,565

(22) PCT Filed: Dec. 9, 2022

(86) PCT No.: PCT/EP2022/085124
§ 371 (c)(1),
(2) Date: Jun. 13, 2024

(87) PCT Pub. No.: WO2023/110661
PCT Pub. Date: Jun. 22, 2023

(65) Prior Publication Data
US 2025/0058968 A1 Feb. 20, 2025

(30) Foreign Application Priority Data
Dec. 15, 2021 (IT) ........................ 102021000031418

(51) Int. Cl.
*B65F 1/14* (2006.01)
*B65F 1/00* (2006.01)

(52) U.S. Cl.
CPC ................ *B65F 1/14* (2013.01); *B65F 1/004* (2013.01); *B65F 2001/008* (2013.01); *B65F 2210/176* (2013.01)

(58) Field of Classification Search
CPC .......... B65F 1/14; B65F 1/004; B65F 1/0033; B65F 1/0053; B65F 2001/008; B65F 2210/176
See application file for complete search history.

(56) References Cited

U.S. PATENT DOCUMENTS 5,248,102 A * 9/1993 Bohn .................. B02C 19/0087 241/DIG. 38
6,719,146 B2 * 4/2004 Holmen ................. B65G 29/00 209/522

(Continued)

FOREIGN PATENT DOCUMENTS

CN 112693767 A * 4/2021 ................ B65F 1/14

*Primary Examiner* — Javier A Pagan
(74) *Attorney, Agent, or Firm* — ArentFox Schiff LLP; Michael Fainberg

(57) ABSTRACT

Provided is a waste sorting apparatus having a receiving compartment for receiving at least one object disposed by a user, an object detection system associated with the receiving compartment and configured to classify the at least one object in one of a plurality of predetermined types of object, and a sorting system configured for selectively directing the at least one object to a respective one of a plurality of collecting receptacles based on the classification of the at least one object. The object detection system identifies a location of the at least one object in the receiving compartment. The sorting system has holding devices for holding one or more of the at least one object in the receiving compartment when selectively directing one or more other of the at least one object to a respective collecting receptacle, in case multiple objects of different types are detected in the receiving compartment.

18 Claims, 10 Drawing Sheets

(56) References Cited

U.S. PATENT DOCUMENTS

| | | | | |
|---|---|---|---|---|
| 8,322,641 B2 * | 12/2012 | Jeon | B02C 19/0093 | |
| | | | 209/4 | |
| 8,366,030 B2 * | 2/2013 | Jeon | B02C 19/0093 | |
| | | | 241/34 | |
| 12,076,753 B2 * | 9/2024 | Michalko | G07F 7/0609 | |

* cited by examiner

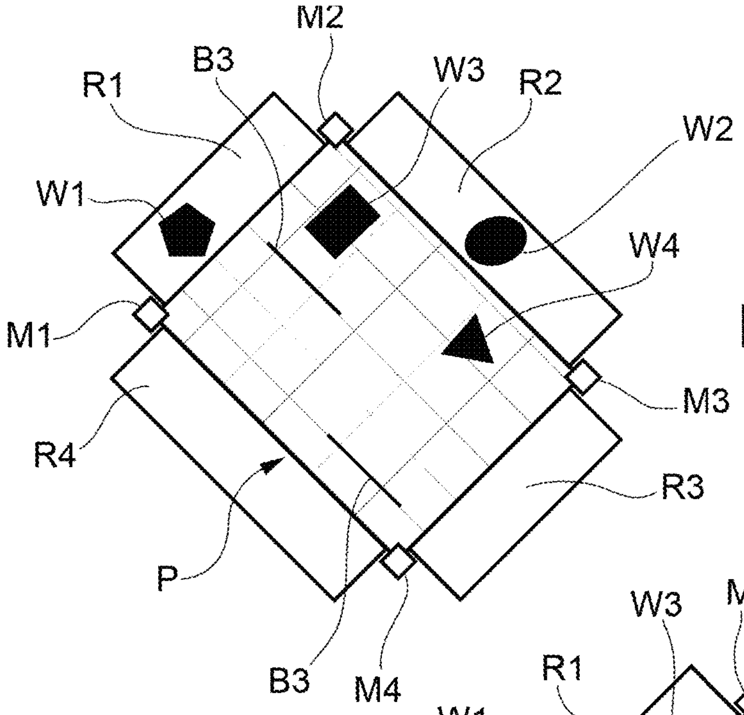
FIG. 4g
FIG. 4h
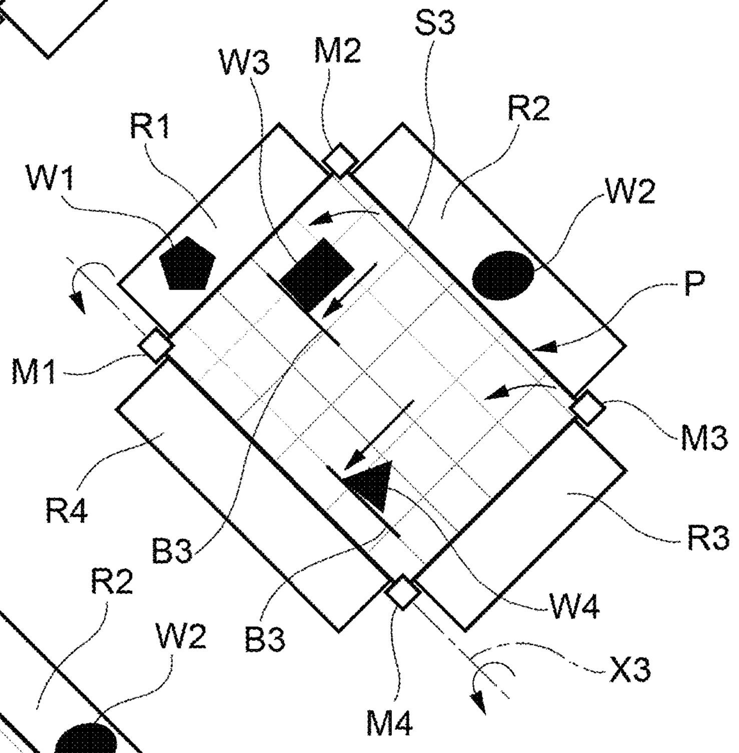
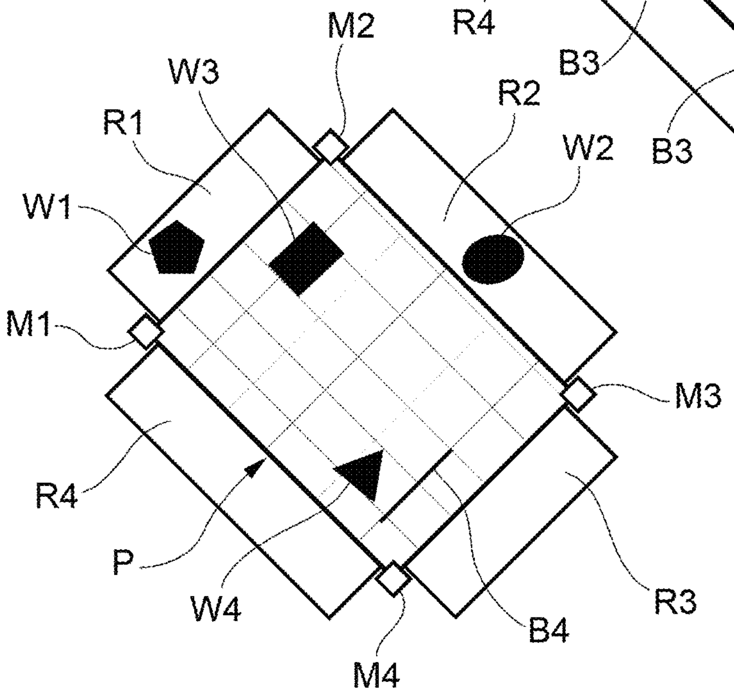
FIG. 4i

WASTE SORTING APPARATUS AND METHOD

CROSS-REFERENCE TO RELATED APPLICATIONS

This application is a National Phase Application of PCT International Application No. PCT/EP2022/085124, having an International Filing Date of Dec. 9, 2022 which claims priority to Italian Application No. 102021000031418 filed Dec. 15, 2021, each of which is hereby incorporated by reference in its entirety.

FIELD OF THE INVENTION

The present invention generally relates to waste sorting and specifically to a waste sorting apparatus comprising a receiving compartment for receiving at least one object disposed by a user, object detection means associated with the receiving compartment and configured to classify the at least one object in one of a plurality of predetermined types of object, and sorting means associated with the receiving compartment and configured for selectively directing the at least one object to a respective one of a plurality of collecting receptacles based on the classification of the at least one object.

BACKGROUND OF THE INVENTION

Solid municipality waste is a proven leading cause of environmental pollution. Since majority of today's waste materials also do not easily degrade, their management in landfills is very tedious and costly.

Recycling of such materials serves as a viable solution as it transforms otherwise polluting materials to a useful state. This renews the financial value of the material and eradicates the cost of managing these materials as waste in the landfill. However, since transformation to a new use comes has its own cost, it is critical to minimize this cost in order to achieve financial sustainability.

Sorting of recyclables accounts for a large proportion of the overall recycling cost. Conventionally, this process is carried out in bulk, downstream of the waste collection process, which requires very costly machineries. Bulk collection of waste for downstream sorting also results in contamination of recyclables to increase the cleaning related energy cost of the waste transformation process.

Color coded recycling bins were introduced as a response to these problems, in order to achieve source sorting of recyclables. However, in the absence of any monitoring system, up to 40% of users dispose non recyclables and contaminations into these bins, which could be attributed to carelessness and/or lack of knowledge.

In recent times, so called smart bins and reverse vending machines have been introduced to detect and sort waste items right at the point of disposal. However, all of the available technologies still rely on the user to dispose one material type at a time or a bulky downstream conveyor belt sorting system. This significantly increases the time commitment of the user and could be a discouragement for subsequent use-hence why these technologies are dependent on incentive offerings to users.

SUMMARY OF THE INVENTION

The aim of the present invention is to provide a solution that avoids the drawbacks of the prior art. Particularly, an aim of the present invention is to provide an apparatus and method that allows for automatic waste sorting in a simple and efficient manner, thus joining the simplicity of use by people with the efficiency of sorting different waste typology.

A further aim of the present invention is to provide a waste sorting system that is capable of sorting items of different typology that are disposed at the same time by a user into a waste sorting apparatus.

According to the present invention, these aims are achieved by a waste sorting apparatus as described and claimed herein.

Preferred embodiments are also described.

Features of the dependent claims may be combined with the features of the independent claims as appropriate and to the extent that they are compatible, and in combinations other than those explicitly set out in the claims.

A further subject of the invention is a method of operating a waste sorting apparatus as claimed.

In summary, the present invention is based on a position-based approach for sorting multiple material waste items that are simultaneously introduced into a receiving compartment of a so called smart bin or any similar waste sorting apparatus, when disposed by a user.

The position based approach is implemented through the provision of detection means of waste items/objects, which are arranged for locating and classifying the disposed items/objects that are introduced into the receiving compartment of the waste sorting apparatus, and holding means acting for selectively holding one or more of the simultaneously disposed items/objects when others items/objects of a different type are directed to a respective collecting receptacle.

In a currently preferred embodiment, upon introduction of waste items into the waste sorting apparatus of the invention, the items are held on a base plate of the receiving compartment where object detection, such as image recognition, and artificial intelligence is used to identify the material types to aid the diversion of individual material types to a respective collecting receptacle. The apparatus of the invention is designed to sort multiple waste fractions that are simultaneously disposed using a position specific holding technique that activates position specific holding means to retain multiple waste types on the base plate while a tilting motion is used to drop only the target material type into a target collecting receptacle. This position-hold and tilt-drop procedure is repeated until all material types introduced into the apparatus are individually dropped into their respective collecting receptacle.

In order to implement fast sorting of waste items/objects, the invention uses tilt or drop mechanisms as a sorting system, preferably with multiple degrees of freedom, thus conveniently avoiding bulky conveyor belts that would prevent embedding of the sorting system into small sized bins.

The features of the invention allow to provide a multiple waste stream self-sorting smart bin which automatically achieves the sorting of items of different typology that are disposed at the same time by a user, possibly further comprising a rewarding system for the user, configured to issue a tangible reward or drive a waging machine depending upon the classification of the item(s)/object(s) in one or more of a plurality of pre-determined types of item(s)/object(s) that may be recycled.

According to a preferred embodiment of the waste sorting apparatus of the invention, the sorting system associated with the receiving compartment and arranged for selectively directing the waste items to a respective one of a plurality of collecting receptacles based on the classification of said object includes at least a moving or configurable base plate of the receiving compartment arranged for receiving said waste items and for selectively dropping each of said waste items to a respective one of a plurality of collecting receptacles based on the classification of said waste items.

According to an alternative embodiment of the waste sorting apparatus of the invention, the sorting system includes displacing members configured for selectively moving said waste items across a stationary base plate of the receiving compartment to a respective one of a plurality of collecting receptacles based on the classification of said waste items.

The waste sorting apparatus of the invention further includes a processing system configured for controlling actuation of said at least a moving plate or said displacing means, and for selectively actuating said holding means based on the classification and location of said waste items and the controlled actuation of said at least a moving plate or said displacing means.

In a first preferred exemplary embodiment the holding means include a plurality of barriers independently raising from the surface of the moving plate, said barriers being for example collapsible walls, tiltable walls or slidable walls, said slidable walls being preferably movable on grid-based guides and slidable along said guides over the plate or out from and in to the plate, actuation of the plates being performed by said processing system based on the detected location of the object so as to build an enclosure all around the object or at least a stopping formation at a side of the object in order to prevent its movement beyond said formation with the moving plate in a tilted condition.

In a second preferred exemplary embodiment the holding means include devices configured to selectively generate a material specific holding force field, such as a magnetic field, an electrostatic field or a fluidodynamic pressure field. It is to be understood that said holding means may be implemented according to the known art, such as for example by providing an array of electrically conductive coils arranged at a plurality of regions of the base plate and selectively driven by said processing system to hold a metal object lying on a region of the base plate based on the detected location of the object, or an array of electrically charged plates arranged at a plurality of regions of the base plate and selectively driven by said processing system to hold an electrically charged object lying on a region of the base plate based on the detected location of the object, or by providing respective arrays of air blowers at the sides of the base plate or at the sides of the receiving compartment and facing the surface of the base plate, which are selectively driven by said processing system based on the detected location of the object to hold objects lying on the flow trajectory against the gravity force acting on the object with the moving plate in a tilted condition.

In a third preferred exemplary embodiment the holding means include materials configured to selectively generate an adhesion force to said waste items, such as an electrically actuated glue. It is to be understood that said holding means may be implemented according to the known art, such as for example by providing an array of regions of the base plate having respective glue spots and a corresponding plurality of electrodes contacting said glue spots, which are selectively driven by said processing system to hold an object lying on a region of the base plate based on the detected location of the object.

In a variant embodiment the holding means may not be provided in an array of independently actuatable elements, but they include a single actuatable element acting on the whole surface of the plate, what allows to select objects of different materials independently of their position, such as for example to select metal object, electrically charged objects, lightweight objects or objects whose material does not adhere to the glue.

In a fourth preferred exemplary embodiment, the holding means include devices configured to selectively mechanically clamp said waste items.

According to the invention, the sorting system associated with the receiving compartment and including at least a moving plate of the receiving compartment, arranged for receiving said waste items and for selectively dropping each of said waste items to a respective one of a plurality of collecting receptacles based on the classification of said waste items, further include displacing means configured for displacing said waste items on the moving plate based on the classification and location of said waste items and the controlled actuation of the moving plate.

In a first embodiment, said displacing means—used for either sorting on a stationary plate or for moving objects on a movable or configurable plate—include pushing members or a plurality of multi-axis rollers embedded in the stationary base plate or in the moving plate. It is to be understood that said displacing means may be implemented according to the known art, such as for example by providing an array of telescopic extendable pushing members at the sides of the base plate or at the sides of the receiving compartment and facing the surface of the base plate, or at least a single moving pushing member at a side of the base plate that is arranged to translate sideways, which are selectively driven by said processing system based on the detected location of the object, to direct the object lying on their moving trajectory to the collecting receptacle at the opposite side of the plate, or by providing said plurality of multi-axis rollers wherein each wheel of said rollers can be selectively actuated by said processing system based on the detected location of the object to precisely direct the object to its respective collecting receptacle. Operating each wheel of said rollers independently from the others or at different speeds allows to implement equivalent relative holding means between the items.

In a second embodiment, said displacing means include devices configured to selectively generate a material specific displacing force field, such as a magnetic field, an electrostatic field or a fluidodynamic pressure field. It is to be understood that said displacing means may be implemented according to the known art, such as for example by providing an array of electrically conductive coils arranged at a plurality of regions of the base plate and selectively driven by said processing system to displace a metal object lying on a region of the base plate to another region of the base plate based on the detected location of the object and on a calculated destination location of said object on the plate, or an array of electrically charged plates arranged at a plurality of regions of the base plate and selectively driven by said processing system to displace an electrically charged object lying on a region of the base plate to another region of the base plate based on the detected location of the object and on a calculated destination location of said object on the plate, or by providing respective arrays of air blowers at the sides of the base plate or at the sides of the receiving compartment and facing the surface of the base plate, which are selectively driven by said processing system based on the detected location of the object and on a calculated destination location of said object on the plate, to displace objects lying on the flow trajectory across the stationary base plate to another region of the base plate.

A calculated destination location of an object on the base plate may be calculated by the processing means depending on the detected location of the object, the destination collecting receptacle of said object and the destination collecting receptacle(s) of (an) other object(s) on the plate to be sorted beforehand.

According to the invention, the object detection means are configured to classify the waste items in one of a plurality of predetermined types of object depending on the material thereof, and preferably include one or more of optical recognition means, metal detection means, weight detection means.

Preferably, motion detecting means are provided that are configured for detecting introduction of at least a waste item disposed by a user in the receiving compartment and for activating the object detection means.

According to a first embodiment of the invention, the moving plate is a tilting plate configured to selectively tilt around a predetermined axis to a first disposal position, wherein a waste item is dropped to a first one of said plurality of collecting receptacles, and to a second disposal position, wherein a waste item is dropped to a second one of said plurality of collecting receptacles.

According to a second embodiment of the invention, the moving plate is coupled with a plurality of linear actuators arranged at edges of said plate and configured to selectively act on a respective edge so as to tilt said plate around a corresponding axis to a respective disposal position wherein a waste item is dropped to a respective collecting receptacle.

According to a third embodiment of the invention, the moving plate is a plate including a plurality of divisions, each division having disposing means configured to selectively drop a waste item to a collecting receptacle associated with said plate division. The disposing means include for example a flipping plate or drop door configured to selectively flip or open to a disposal position. For example, the moving plate is divided in quarters, each one including a flipping plate or drop door configured to selectively flip or open to a disposal position, wherein an object is dropped to the collecting receptacle associated with said plate quarter.

The invention allows users to simultaneously dispose multiple items and material types, just as they will have used a regular bin, and sorts the items into separate waste containers in a compact and fast manner. This minimizes reliance on user behavior during the disposal process and hence allows for applications in the absence of incentives. The fast and compact nature of the invention also serves to minimize cost and footprint of the technology in the use space.

BRIEF DESCRIPTION OF THE FIGURES

Further functional and structural characteristics and advantages of the present invention are set out in the detailed description below, provided purely as a non-limiting example, with reference to the attached drawings, in which:

FIGS. 4*a*-4*m* are schematic views of a process flow for sorting four different materials simultaneously dropped into the waste sorting apparatus of the invention, based on an embodiment of the holding means as a physical grid of raising barriers.

FIGS. 1*a* and 1*b* show an exemplary embodiment of a waste sorting apparatus according to the invention, generally indicated 10.

DETAILED DESCRIPTION

Figure 1A:
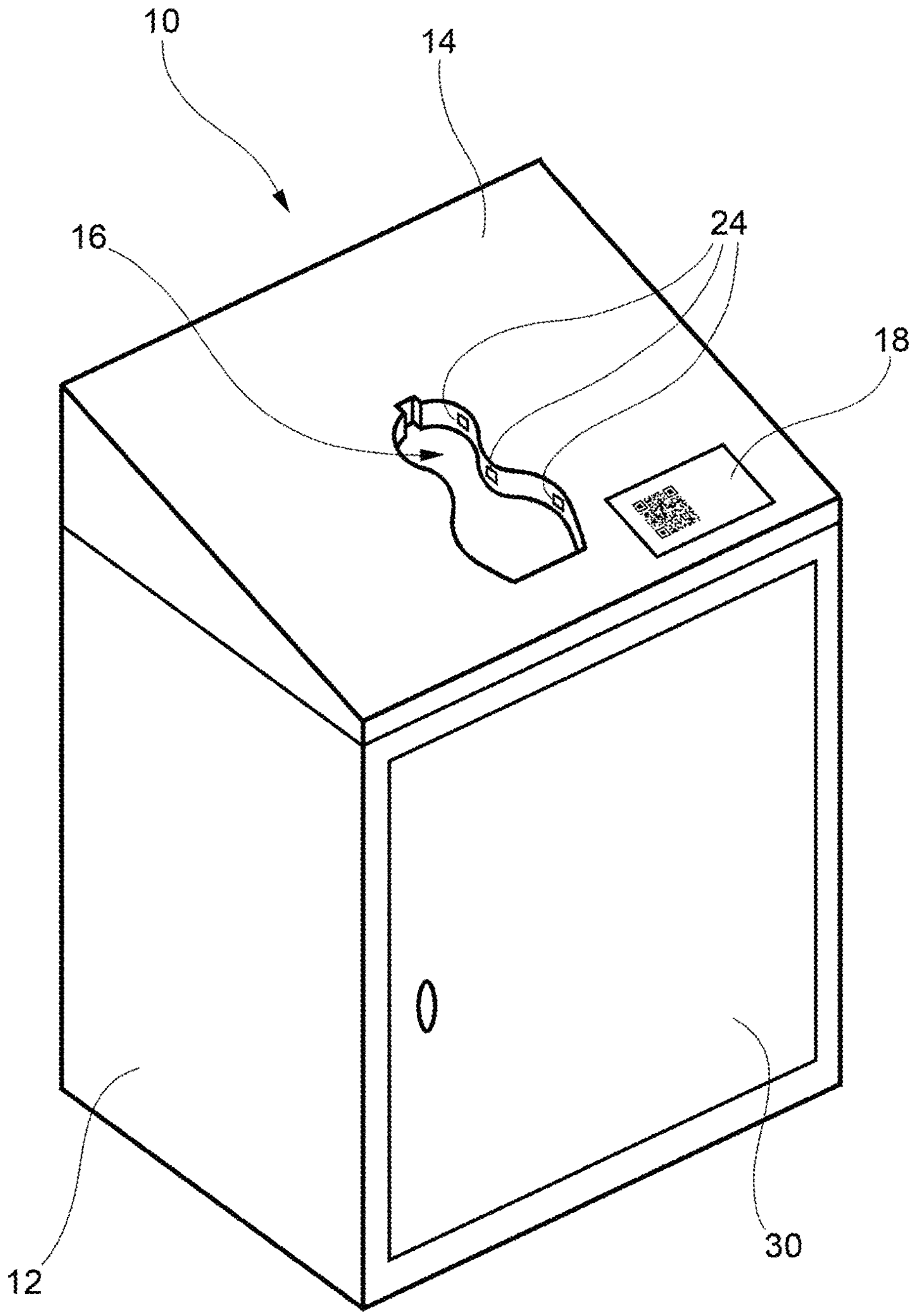
FIGS. 1*a* and 1*b* are perspective views of an exemplary embodiment of a waste sorting apparatus according to the invention, FIG. 1*b* being a partially open perspective view of the apparatus depicted in FIG. 1*a;*

The waste sorting apparatus 10 comprises a box shaped casing 12 having at least a front side 14 provided with at least one opening 16 for disposal of waste items, in the following also indicated as objects, by a user, and user interface means for communicating with a user e.g. though a display 18 or loudspeakers. Inside the casing, a receiving compartment 20 is defined for temporarily receiving at least one object disposed by a user, and object detection means—schematically indicated 22 in the exemplary form of optical recognition means including a camera for acquiring images of the receiving compartment—are associated with the receiving compartment and configured to classify said object in one of a plurality of predetermined types of object, at least one of said plurality of predetermined types of object being representative of a material that may be subjected to recycling, such as paper, plastics or metal. For example, in the most simple application of a waste sorting apparatus intended to receive only one type of waste to be recycled, such as plastics bottles, which is the one depicted in FIGS. 1*a* and 1*b*, said object detection means are configured for classifying any object disposed by a user in the receiving compartment as either plastics or undifferentiated item.

Alternatively, an enhanced waste sorting apparatus may be intended to receive a greater number of types of waste to be recycled, e.g. three types of waste such as paper, plastics and metal, and said object detection means are configured for classifying any object disposed by a user in the receiving compartment into one of four types including paper, plastics, metal and undifferentiated item. This further embodiment will be described in the following with reference to FIGS. 4*a*-4*m*.

The waste sorting apparatus 10 further includes motion detecting means 24 configured for detecting introduction of at least an object disposed by a user in the receiving compartment and for activating said object detection means. In the depicted example, said motion detecting means 24 are exemplary depicted as installed at the disposal opening 16.

The receiving compartment has at its floor a base plate 26 where the disposed objects lie before their sorting occurs. The object detection means 22 are further configured to identify the location of one or more objects in the receiving compartment and more specifically on the base plate 26 with respect to a predetermined reference system of said plate, such as a Cartesian coordinate system based on the edges of the plate.

Figure 1B:
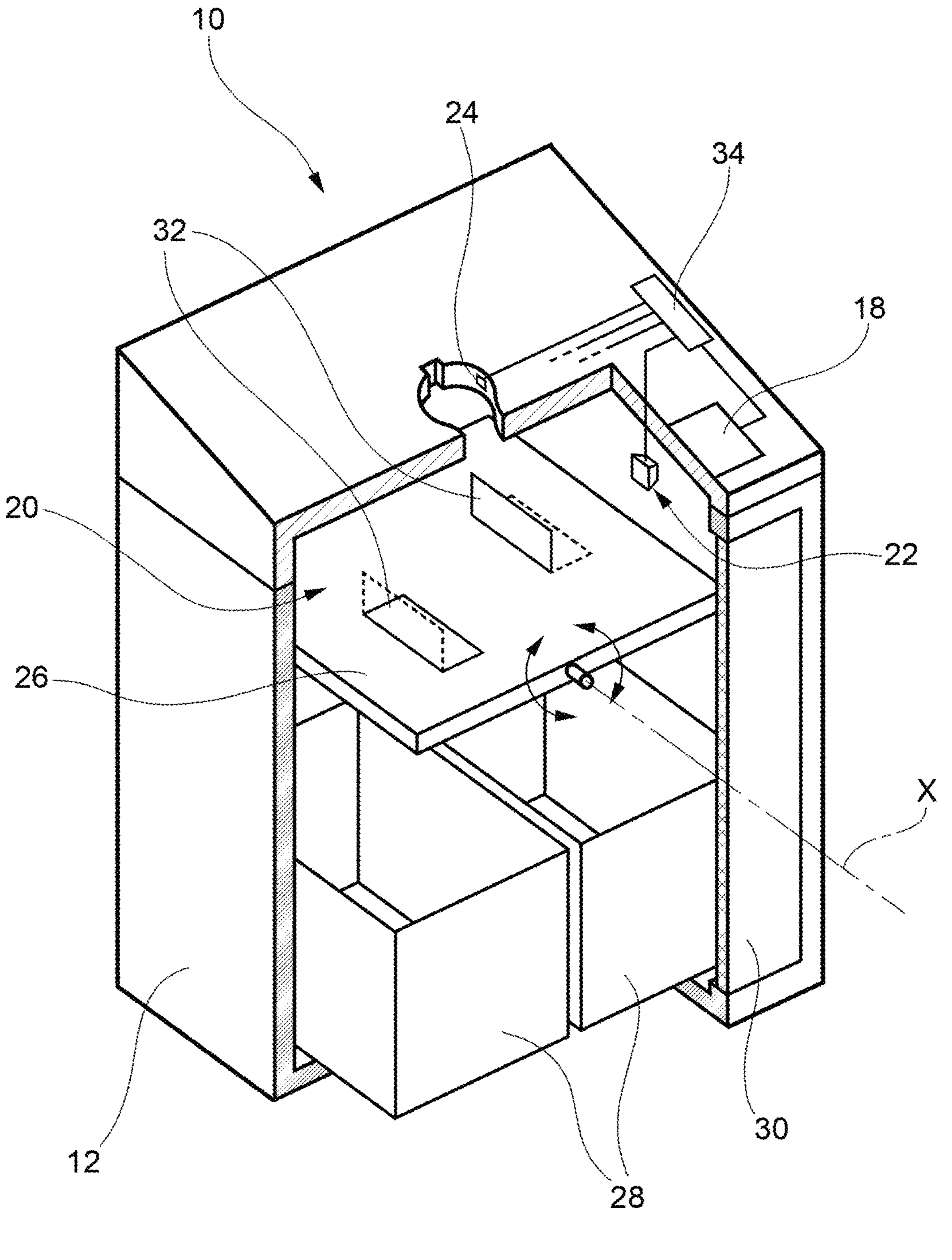

Said base plate 26 may be a moving or configurable base plate, or it may be a stationary base plate. In the embodiment of FIG. 1*b* the base plate is a moving base plate which is arranged for receiving the disposed objects and for selectively dropping them to a respective one of a plurality of collecting receptacles 28 that are arranged underneath said plate, as shown in FIG. 1*b*, e.g. by tilting around a plate axis X.

In an alternative embodiment, the stationary base plate is associated with displacing means, either arranged at the sides of the plate or within the surface of the plate, that are configured for selectively moving the disposed objects across the plate to a respective one of a plurality of collecting receptacles that are arranged at least partially sideways of the plate.

A door 30 is provided in the box shaped casing 12 of the waste sorting apparatus 10 for accessing the collecting receptacles 28, e.g. for their withdrawal and discharge.

The moving plate and the displacing means form alternative sorting means of the waste sorting apparatus 10 which are arranged for selectively directing the disposed objects that lie on the base plate 26 to a respective one of said plurality of collecting receptacles 28, based on the object classification performed by the object detection means 22. More specifically, an exemplary embodiment where the sorting means include a moving (tiltable) base plate will be described in the following with reference to FIGS. 3*a*-3*f*, whereas an exemplary embodiment where the sorting means include displacing means associated with a stationary base plate will be described in the following with reference to FIGS. 4*a*-4*m*.

The base plate 26 includes tilting barriers 32 as an exemplary embodiment of holding means for holding one or more objects onto the base plate in the receiving compartment when selectively directing one or more other objects to a respective destination collecting receptacle 28, in case multiple objects of different types are detected in the receiving compartment.

Processing means are generally indicated 34 in FIG. 1*b* are configured for controlling the actuation of the moving base plate 26, e.g. through an associated motor, as well as for selectively actuating the tilting barriers based on the classification and location of the disposed objects and the controlled actuation of the moving plate, i.e. whether the moving plate is tilted around axis X to a first disposal position, wherein an object is dropped to a first one of said plurality of collecting receptacles 28, and to a second disposal position, wherein an object is dropped to a second one of said plurality of collecting receptacles 28.

Figure 2:
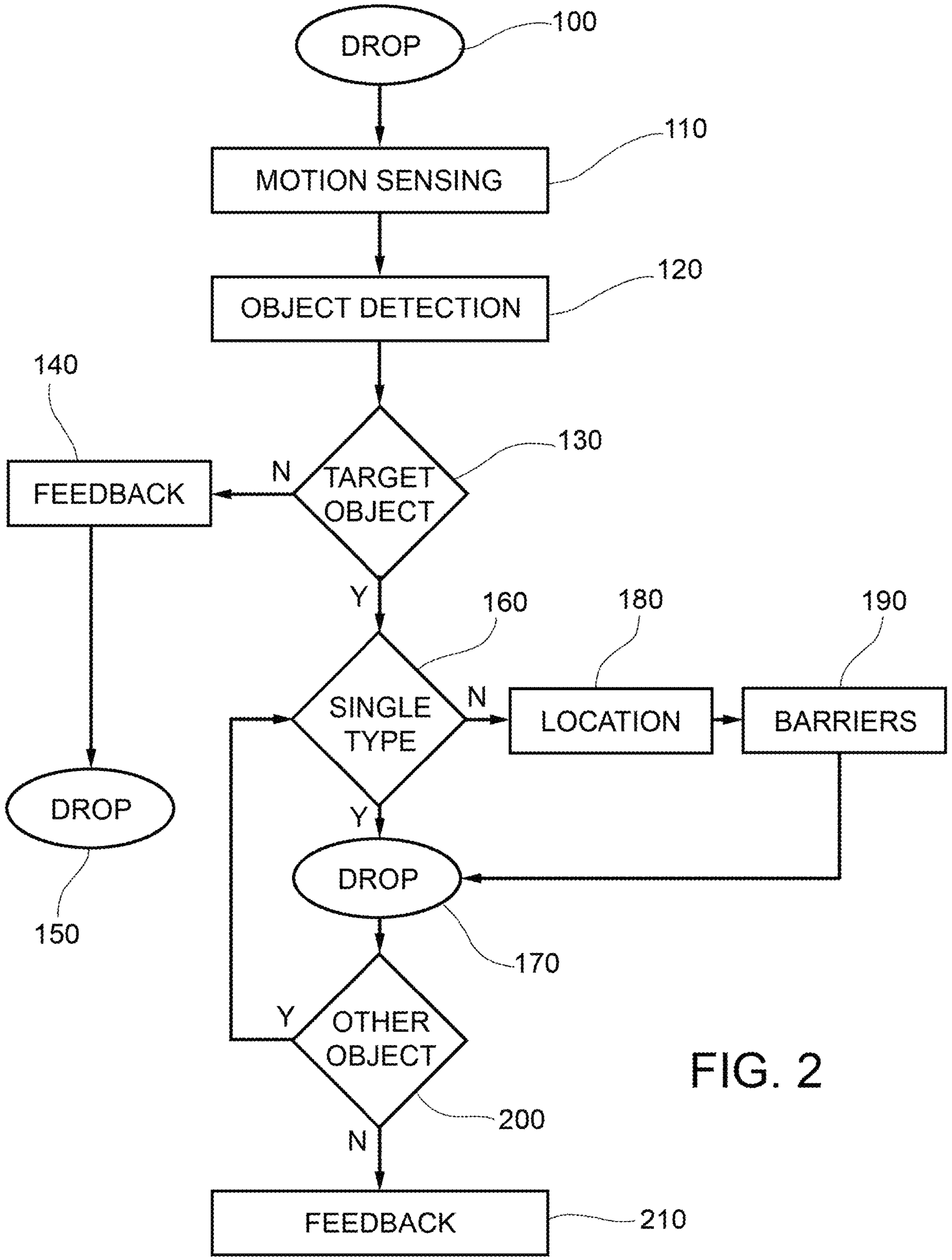
FIG. 2 is a flow chart of operation of the waste sorting apparatus of the invention.

FIG. 2 shows a general flow chart of a method of operating the waste sorting apparatus 10 of the invention. Specifically, the process flow diagram of FIG. 2 describes the grid-barrier and tilt-drop mechanism for the waste sorting apparatus 10 of the invention when sorting two or more material types.

At step 100 a user drops one or a plurality of waste items (objects) in the receiving compartment of the apparatus.

At step 110 the introduction of at least an object disposed by a user in the receiving compartment is detected, thus activating the object detection means.

In the embodiment where the object detection means include a camera for image recognition means at step 120 said camera acquires multiple images of the object(s) lying on the base plate and send them to the processing means running an object detection and classification algorithm.

At step 130 the processing means assess whether any of predetermined target objects are classified, i.e. whether objects have been identified that can be sorted in respective collecting receptacles depending on their material.

In the negative, which is the case where undifferentiated objects have been disposed in the apparatus, i.e. object whose material cannot be sorted in that apparatus, the apparatus gives a negative feedback to the user by means of any one of possible user interfaces, such as a display screen or loudspeakers, at step 140, then the processing means control the motor(s) actuating the base plate at step 150 so as to drop the object(s) into the collecting receptacle designated for mixed, undifferentiated objects.

In the affirmative, i.e. whether at least an object is classified in one of a plurality of predetermined types of object that can be sorted and collected by that apparatus, at step 160 the processing means assess whether all classified target objects are of a single type, i.e. a single material type.

In the affirmative, at step 170 the processing means control the motor(s) actuating the base plate, without having previously actuated any holding means, so as to drop all the object(s) into the collecting receptacle designated for that material type. In the negative, at step 180 the processing means identify and map out the location of each dropped object on the base plate and calculate the coordinates for the bounding barriers that are needed to encapsulate all but a first material type. At step 190 the processing means control raising the bounding barriers to encapsulate all but said first material type, and the method proceeds to step 170 where the processing means control the motor(s) actuating the base plate so as to drop all the object(s) of a first material type into the collecting receptacle designated for that material type.

After step 170 has been performed the processing means check whether any other object is still lying on the base plate at step 200.

In the affirmative, the process returns to step 160, otherwise the apparatus gives a positive feedback to the user by means of any one of possible user interfaces, such as a display screen or loudspeakers, at step 210. Where a reward is offered, the apparatus communicates said reward to the user, such as by issuing a code or a notification to a specific electronic wallet or by driving an associated waging machine, e.g. depending upon the classification of said object in one of a plurality of predetermined types of object.

In the embodiment of FIGS. 3*a*-3*f* disclosed by way of example is a moving (tilting) plate P acting as a sorting means, which includes barriers B as holding means formed as grid-based physical tilting (or in a variant embodiment, sliding) walls. For sorting only two material types, the process flow of FIGS. 3*a*-3*f* describes the operation. This embodiment includes a single motor M connected to the plate P with grid-based barriers B embedded.

Figure 3A:
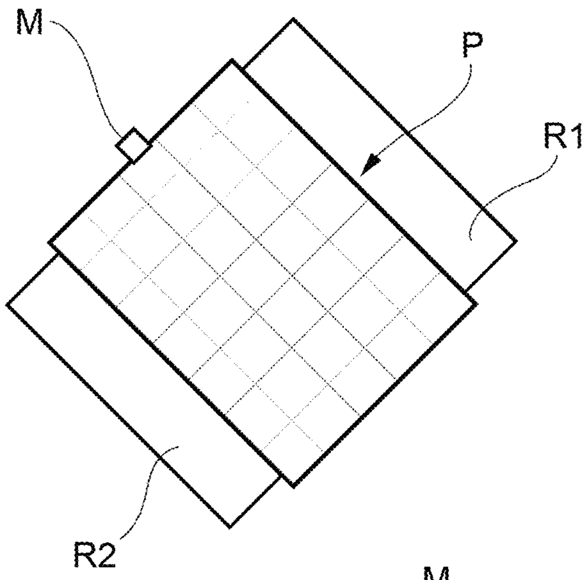
FIGS. 3*a*-3*f* are schematic views of a process flow for sorting two different materials simultaneously dropped into the waste sorting apparatus of the invention, based on an embodiment of the holding means as a physical grid of raising barriers.

FIG. 3*a* shows an empty base plate P of the receiving compartment with suppressed grid barriers. R1 and R2 are associated collecting receptacles.

Figure 3B:
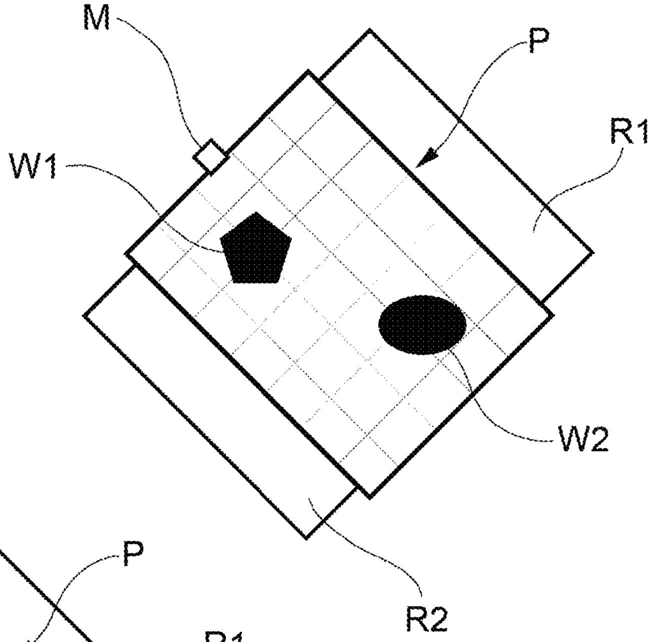

FIG. 3*b* shows two objects W1 and W2 of different material type dropped by a user at the same time into the receiving compartment of the apparatus 10.

When two material types are simultaneously introduced on the base plate, image recognition or like detection technique is used to identify the location of each material and actuators are used to encapsulate one object.

Figure 3C:
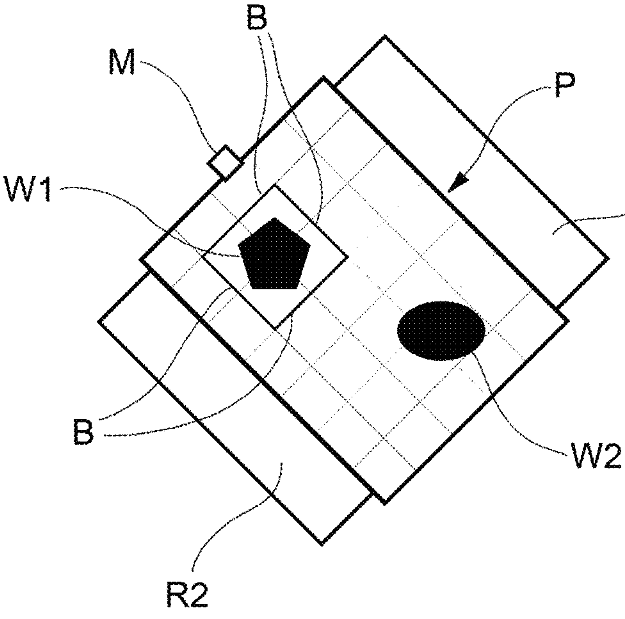

FIG. 3*c* shows elevation of barriers B forming an encapsulating wall around object W1 after classification (e.g. by image recognition) of both objects has been performed and the object material type has been identified.

Figure 3D:
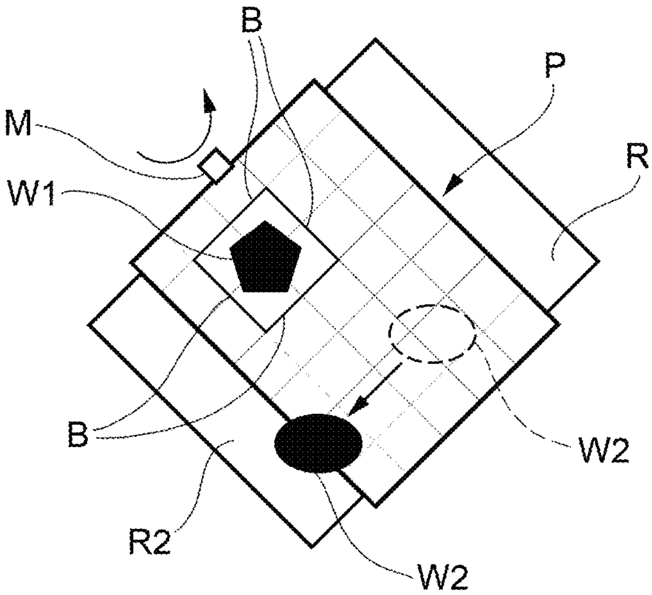

FIG. 3*d* shows clockwise rotation of the motor M to produce a tilt angle of the base plate P and consequently drop unbounded object W2 in the collecting receptacle R2 located on the left-hand side (as depicted by the straight arrow) while holding object W1 on the plate.

Figure 3E:
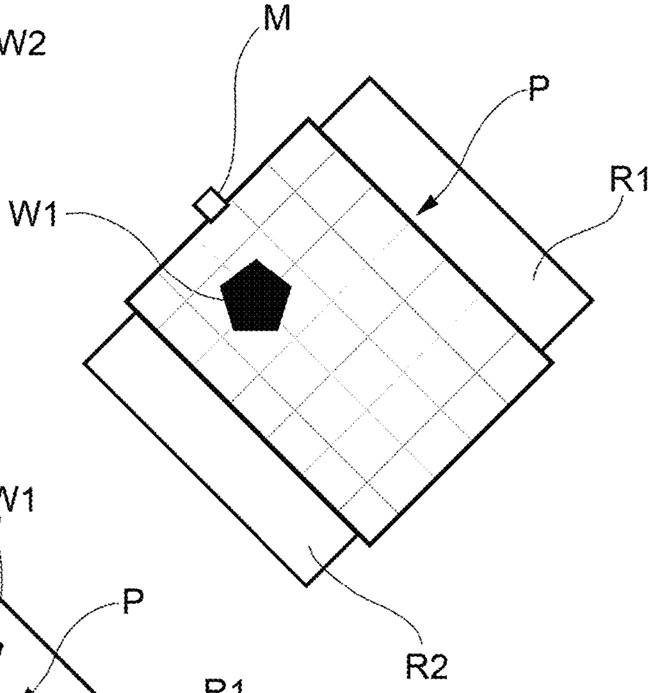
Figure 3F:
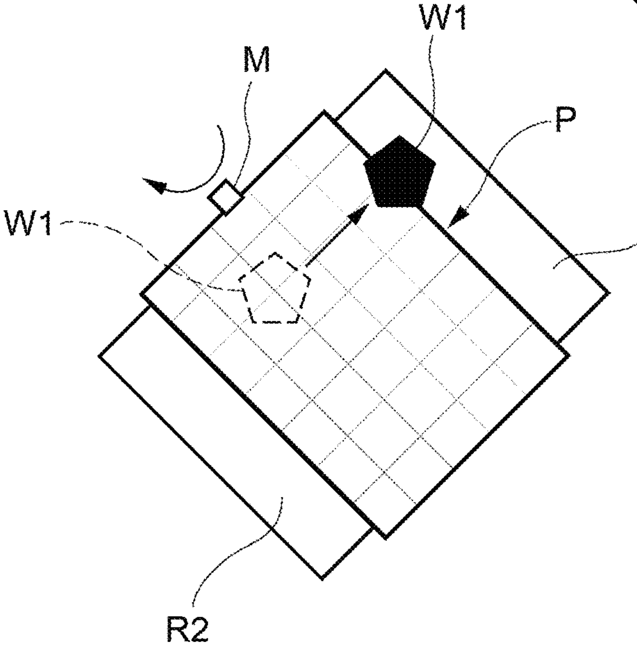

Subsequently, motor M is returned back to its original rest position the barriers B are retracted to unbound object W1 previously hold on the base plate, as shown in FIG. 3*e*, and rotation of the motor in the other direction drops object W1 into the other receptacle R1, as shown in FIG. 3*f* and depicted by the straight arrow.

This system is useful for targeting the collection of one material type in a single recycling collecting receptacle so that any other material dropped into the waste sorting apparatus is diverted into the other undifferentiated collecting receptacle.

Referring now to FIGS. 4*a*-4*m*, in order to specifically target multiple materials, the base plate degree of freedom is increased using multiple angular motors M1-M4 assembled as linear actuators. In the depicted embodiment, the system is designed to target three material types, such as plastics, metal and paper. Hence, any material disposed into the apparatus that is not either of these materials is considered as a fourth undifferentiated material. By implementing multiple linear actuators at the edge of the base plate, the apparatus can be controlled to drop materials into four collecting receptacles R1-R4.

Figure 4A:
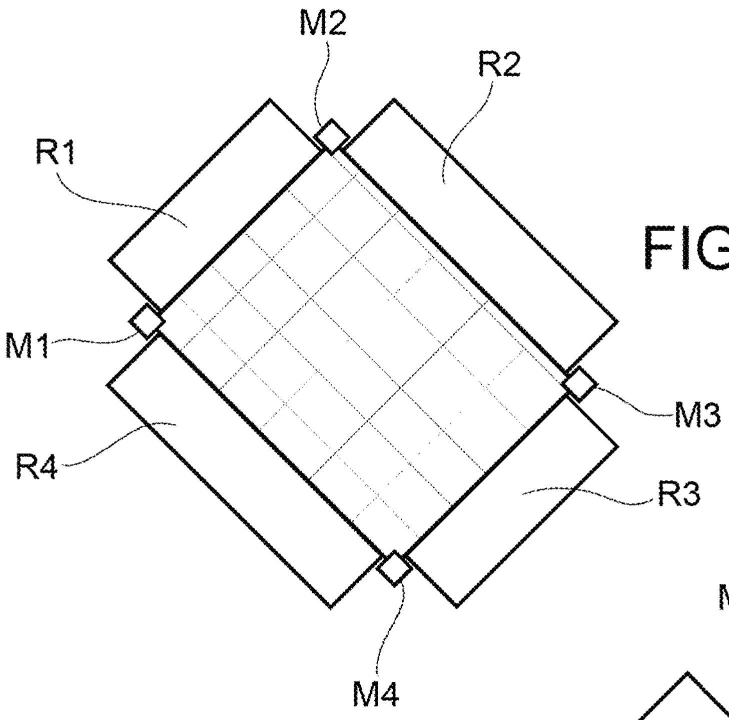

FIG. 4*a* shows an empty base plate P of the receiving compartment with suppressed grid barriers, as well as four collecting receptacles R1-R4.

Figure 4B:
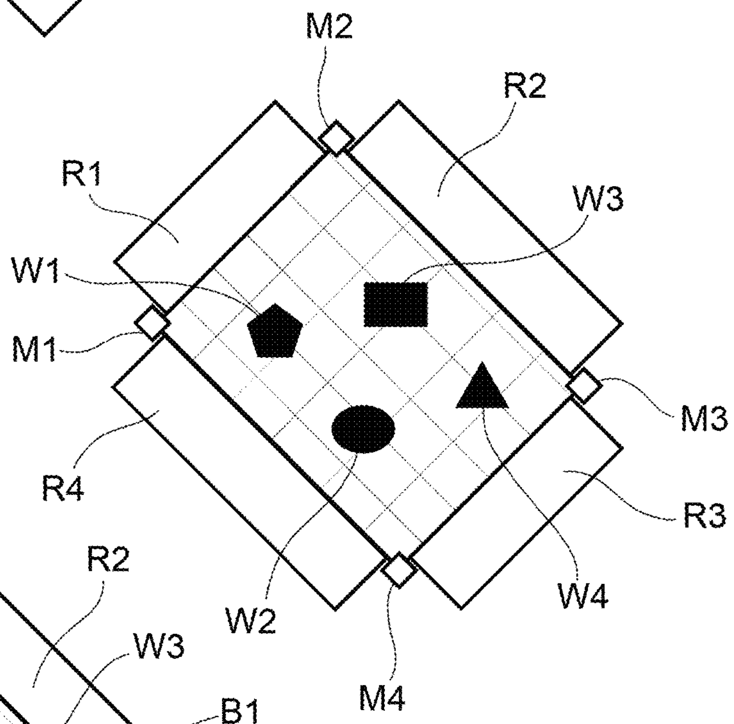

FIG. 4*b* shows four objects W1, W2, W3 and W4 of different material type dropped by a user at the same time into the receiving compartment of the apparatus 10.

When a plurality of material types are simultaneously introduced on the base plate, image recognition or like detection technique is used to identify the location of each material and actuators are used to elevate barriers in order to at least partially encapsulate a subset of objects.

Figure 4C:
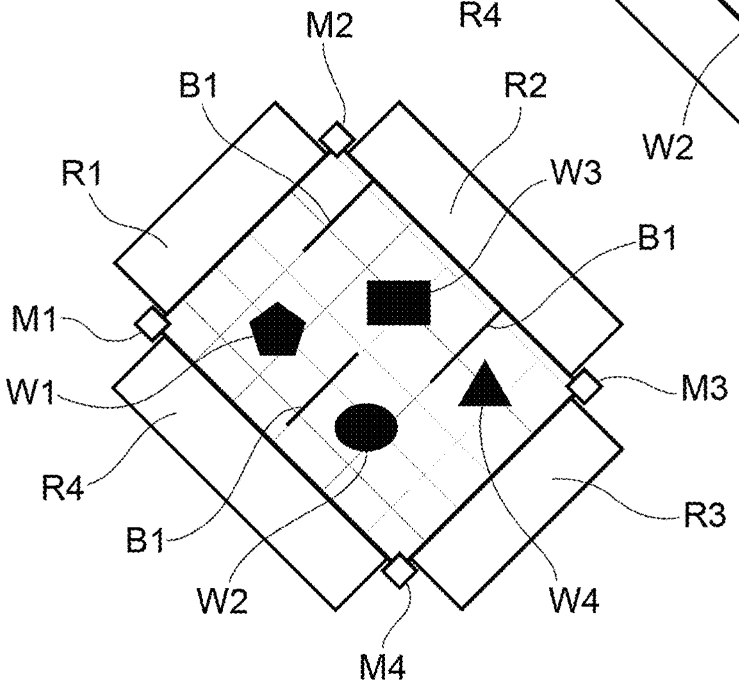

FIG. 4*c* shows elevation of barriers B1 forming retaining walls for three objects W2, W3 and W4 after classification (e.g. by image recognition) of the four objects has been performed and the object material type has been identified.

Figure 4D:
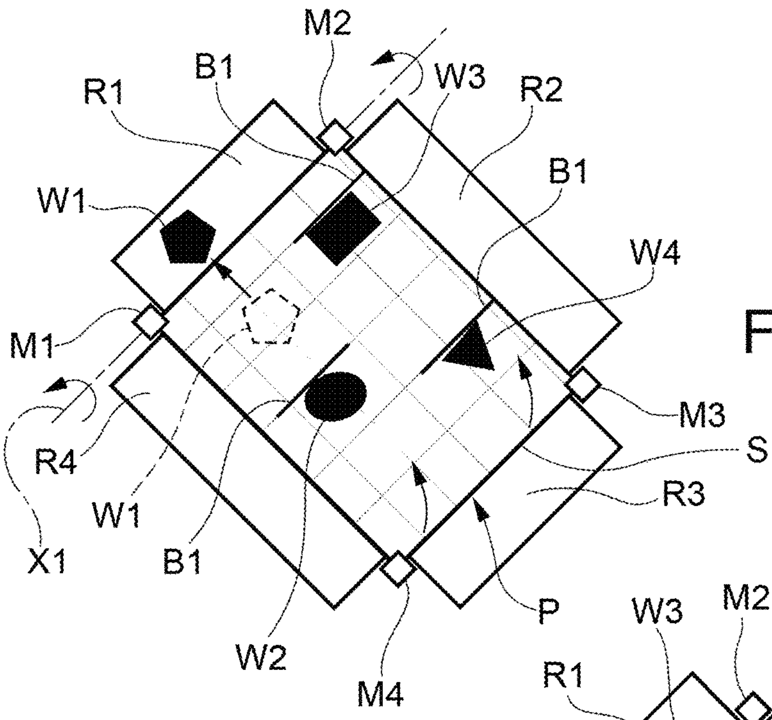

FIG. 4*d* shows actuation of motors M3 and M4 to lift a first corresponding side S1 of the base plate P and consequently tilt the plate around a first axis X1 and drop unbounded object W1 in the collecting receptacle R1 located on the upper-left side of the figure (as depicted by the related straight arrow) while holding objects W2, W3 and W4 on the plate.

Figure 4E:
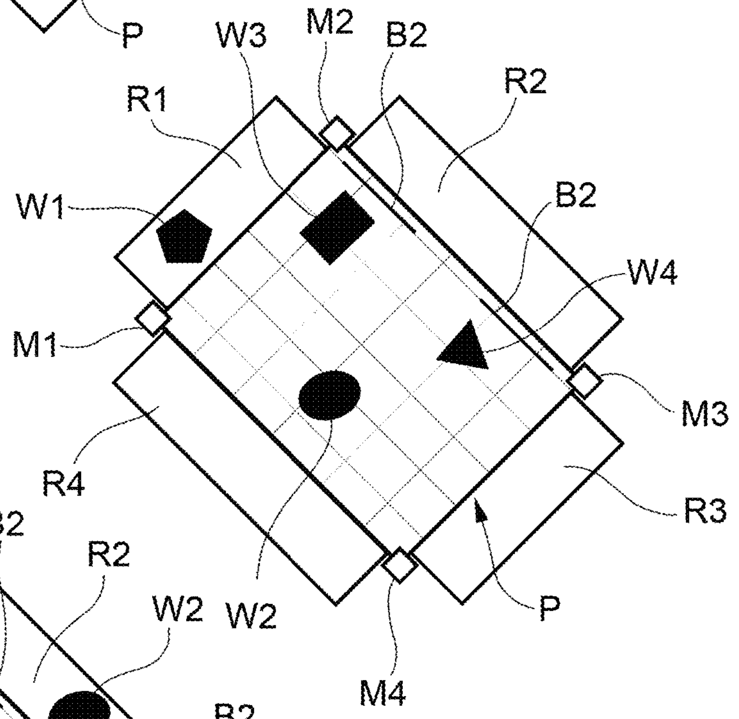
Figure 4F:
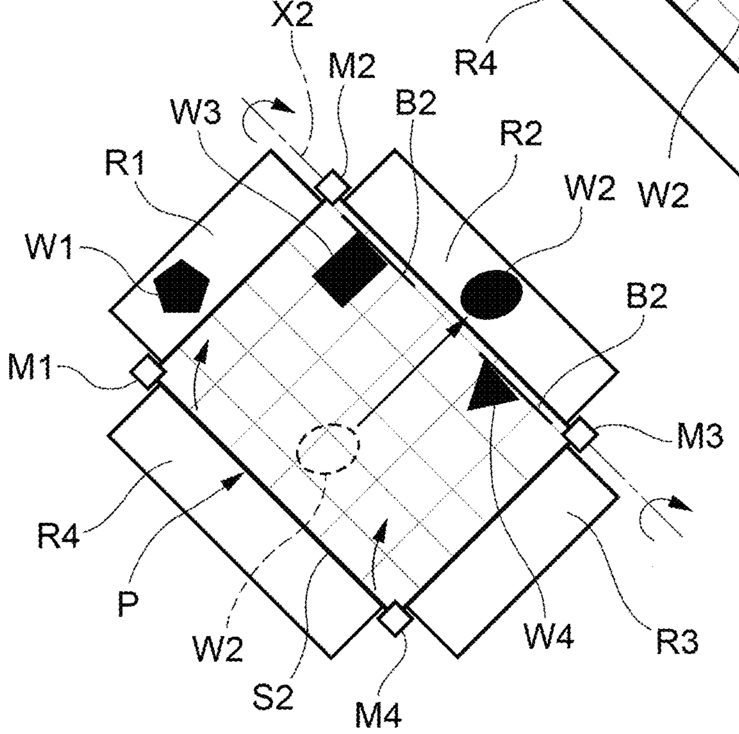

Subsequently, motors M3 and M4 are returned back to their original rest position and barriers B1 are retracted, then barriers B2 are raised forming retaining walls for two objects W3 and W4 as shown in FIG. 4*e*, and motors M1 and M4 are actuated to lift a second corresponding side S2 of the base plate P and consequently tilt the plate around a second axis X2 and drop unbounded object W2 in the collecting receptacle R2 located on the upper-right side of the figure (as depicted by the related straight arrow) while holding objects W3 and W4 on the plate, as shown in FIG. 4*f*.

In a following step, motors M1 and M4 are returned back to their original rest position and barriers B2 are retracted, then barriers B3 are raised forming retaining walls for two objects W3 and W4 as shown in FIG. 4*g*, and motors M2 and M3 are actuated to lift a third corresponding side S3 of the base plate P and consequently tilt the plate around a third axis X3 and adjust position of objects W3 and W4 on the plate (as depicted by the related straight arrows) in order to avoid any possible clash in a subsequent dropping step, as shown in FIG. 4*h*.

In scenarios of potential clash between a target object and an object to be held on the plate, or between a target object and a barrier raised to bound another object, re-positioning of the materials on the base plate is preferred. This process involves using the tilt motion and grid-barriers to strategically move one of the objects to a location that is away from the dropping trajectory of the other object.

Figure 4L:
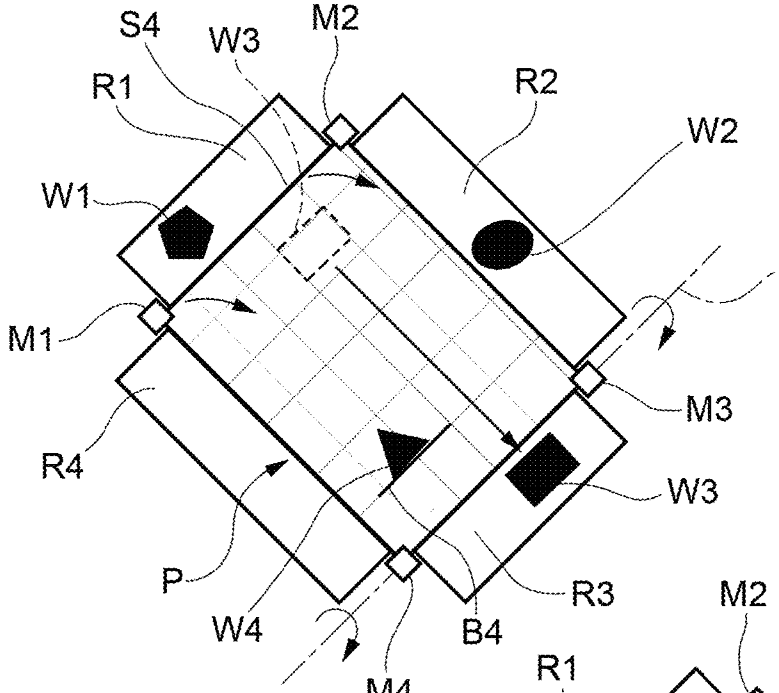

In a further following step, motors M2 and M3 are returned back to their original rest position and barrier B3 confining object W3 is retracted, then barrier B4 is raised forming a retaining wall for object W4 as shown in FIG. 4*i*, and motors M1 and M2 are actuated to lift a fourth corresponding side S4 of the base plate P and consequently tilt the plate around a fourth axis X4 and drop unbounded object W3 in the collecting receptacle R3 located on the lower-right side of the figure (as depicted by the related straight arrow) while holding object W4 on the plate, as shown in FIG. 4*l*.

Figure 4M:
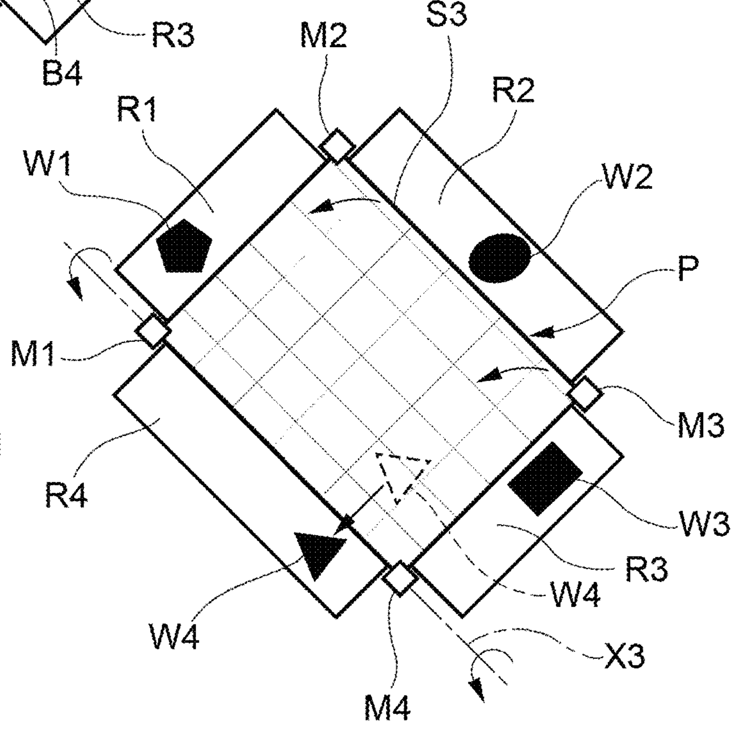

Finally, motors M1 and M2 are returned back to their original rest position and independently of barrier B4 being retracted or not, motors M2 and M3 are actuated to lift the third side S3 of the base plate P and consequently tilt the plate around third axis X3 and drop object W4 in the collecting receptacle R4 located on the lower-left side of the figure (as depicted by the related straight arrow), as shown in FIG. 4*m*.

Sorting is therefore effectively achieved in an automatic manner in case a plurality of waste items are disposed at the same time in the waste sorting apparatus of the invention.

Figure 5A:
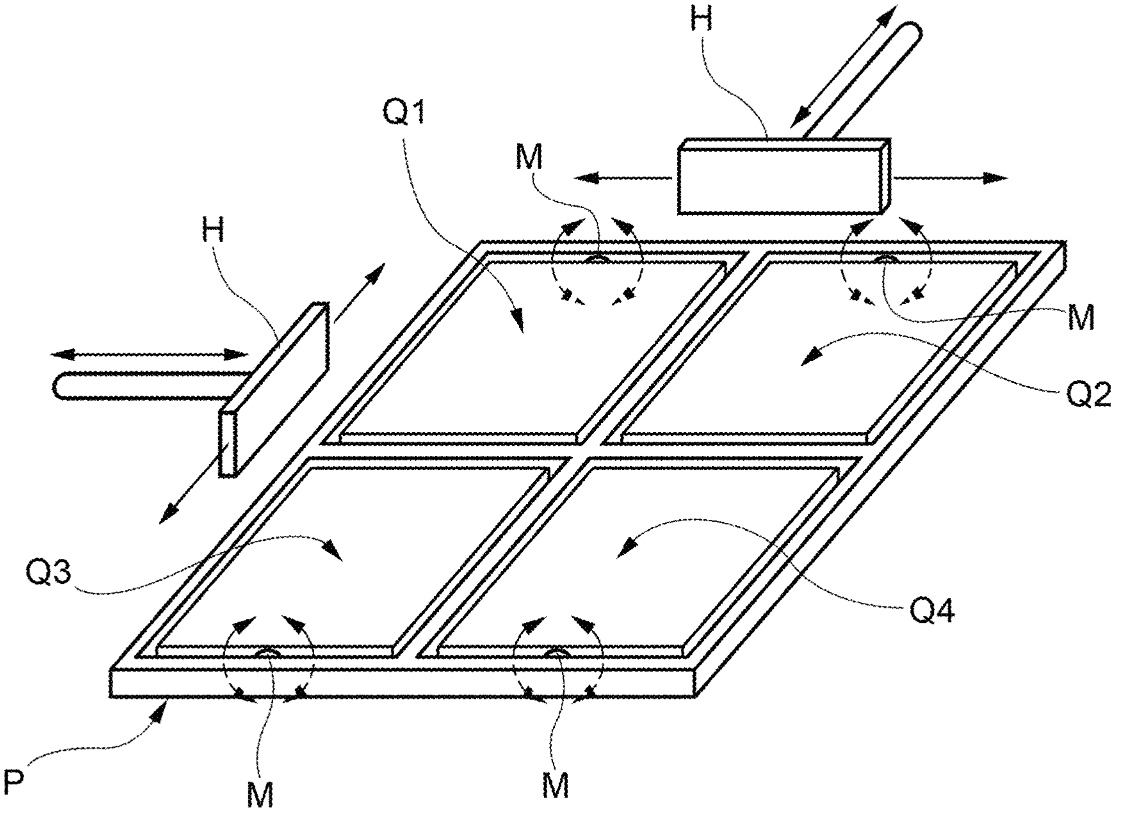
FIGS. 5*a* and 5*b* are schematic views of a base plate with quarter-based dispensing means.
Figure 5B:
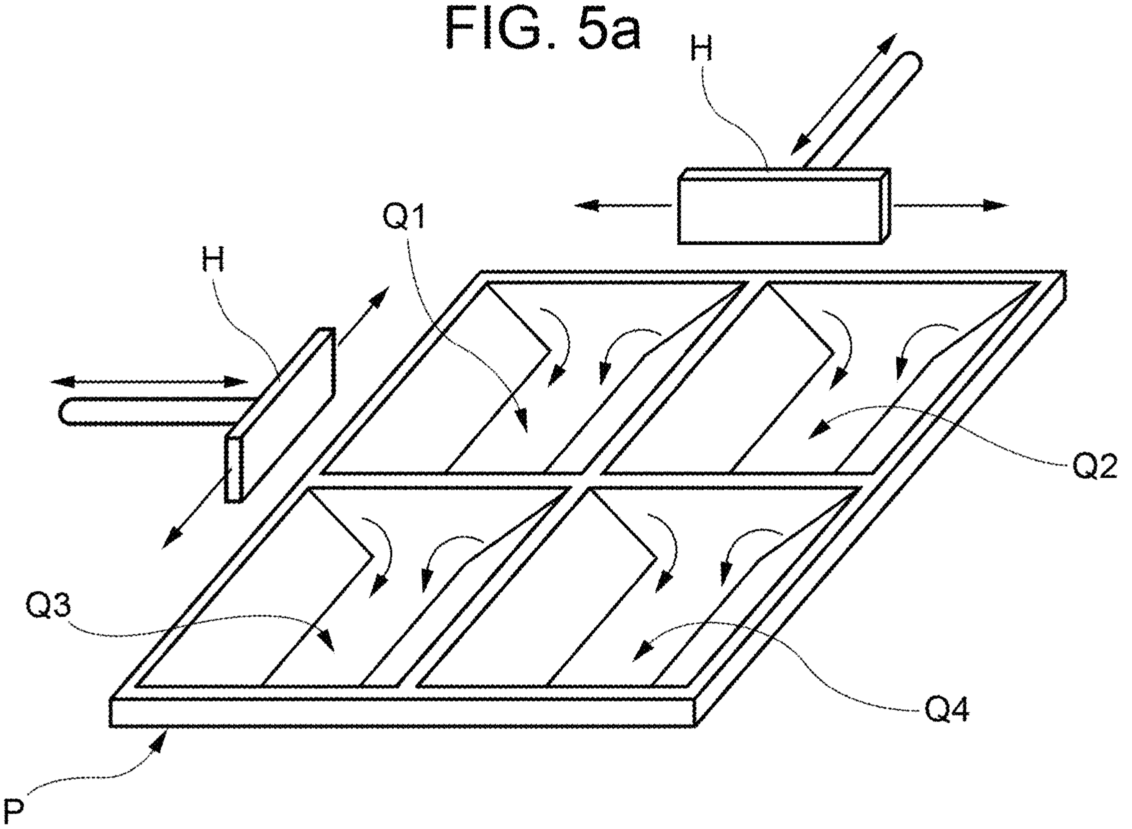

A possible alternative to the moving base plate P of FIGS. 4*a*-4*m*, in order to specifically target multiple materials, is a base plate divided in quarters Q1-Q4, each one including a flipping plate or drop door, as exemplary shown in FIGS. 5*a* and 5*b*. In the figures, flipping plates and drop doors have been depicted separately to show the two solutions, but it is to be understood that different quarters of the plate may include one of the two types of disposing means.

By incorporating four flipping plates or drop doors or any suitable combination of them at four quarters of the base plate P, and by providing at least a moveable (sliding) pushing member H to transfer items from one quarter to another, and preferably two pushing members at orthogonal sides of the plate P, the pushing member(s) H is used to sort each material type into the four quarters and the flipping plates or drop doors are used to selectively drop these materials into the collecting receptacles underneath the respective quarter and dedicated for each material type.

This embodiment is particularly useful for a waste bin with entry chutes for each material type that directs each material to their respective quarter. In cases where items are thrown in through the wrong chute, the pushing members are then used to transfer them to their correct quarter.

In cases where only a single entry chute is mandatory, and there are single items being dropped at a time, a moving base plate coupled with a plurality of linear actuators arranged at its edges and configured to selectively tilt the plate around one of a plurality of (e.g. two) axes, such as in FIGS. 4*a*-4*m*, having four quarter drop doors, together with displacing means including at least a moveable pushing member, and preferably a couple of moveable pushing members at orthogonal sides of the base plate, will be extremely efficient. The actuation of the base plate by means of the edge linear actuators goes into play to handle scenarios when one item is dropped at a time, while the pushing member(s) and quarter-based drop doors go into play when there are multiple items dropped at a time.

Of course, the principle of the invention remaining unchanged, the embodiments and the constructional details may vary widely from those described and illustrated purely by way of non-limiting example, without thereby departing from the scope of the invention as defined in the appended claims.

The invention claimed is:

1. A waste sorting apparatus, comprising:

a receiving compartment for receiving at least one object disposed by a user;

object detection means associated with the receiving compartment and configured to classify said at least one object in one of a plurality of predetermined types of object; and sorting means associated with the receiving compartment and configured for selectively directing said at least one object to a respective one of a plurality of collecting receptacles based on the classification of said at least one object, wherein said object detection means are further configured to identify a location of said at least one object in the receiving compartment; and wherein said sorting means include holding means for holding one or more of said at least one object in the receiving compartment when selectively directing one or more other of said at least one object to a respective collecting receptacle, in case multiple objects of different types are detected in the receiving compartment.

2. The waste sorting apparatus of claim 1, wherein said sorting means further include at least a moving or configurable base plate of the receiving compartment suitable for receiving said at least one object and for selectively dropping said at least one object to the respective one of the plurality of collecting receptacles based on the classification of said at least one object.

3. The waste sorting apparatus of claim 2, further comprising a processing system configured for controlling an actuation of said at least a moving or configurable base plate and for selectively actuating said holding means based on the classification and the location of said at least one object and the controlled actuation of said at least a moving or configurable base plate.

4. The waste sorting apparatus of claim 3, wherein said sorting means further include displacing means configured for displacing said at least one object on the at least a moving or configurable base plate based on the classification and the location of said at least one object and the controlled actuation of said at least a moving or configurable base plate.

5. The waste sorting apparatus of claim 4, wherein said displacing means include at least one of:

pushing members;

a plurality of multi-axis rollers embedded in the at least a moving or configurable base plate;

devices configured to selectively generate a material specific displacing force field, wherein said material specific displacing force field includes one of a magnetic field, an electrostatic field and a fluidodynamic pressure field.

6. The waste sorting apparatus of claim 2, wherein said holding means include barriers raising from a surface of the at least a moving or configurable base plate, and wherein said barriers include one of collapsible walls and slidable walls, said slidable walls being movable on grid-based guides.

7. The waste sorting apparatus of claim 2, wherein said at least a moving or configurable base plate is one of:

a tilting plate configured to selectively tilt around a predetermined axis to a first disposal position, in which one of said at least one object is dropped to a first one of said plurality of collecting receptacles, and to a second disposal position, in which another one of said at least one object is dropped to a second one of said plurality of collecting receptacles, a plate coupled with a plurality of linear actuators arranged at edges of the at least a moving or configurable base plate and configured to selectively act on a respective edge so as to tilt said plate around a corresponding axis to a respective disposal position in which one of said at least one object is dropped to a respective collecting receptacle, and a plate including a plurality of divisions, each division having disposing means configured to selectively drop one of said at least one object to a collecting receptacle associated with said plate division.

8. The waste sorting apparatus of claim 7, wherein the disposing means include a flipping plate or drop door configured to selectively flip or open to a disposal position.

9. The waste sorting apparatus of claim 1, wherein said sorting means further include displacing means configured for selectively moving said at least one object across a stationary base plate of the receiving compartment to the respective one of the plurality of collecting receptacles based on the classification of said at least one object.

10. The waste sorting apparatus of claim 9, further comprising a processing system configured for controlling an actuation of said displacing means and for selectively actuating said holding means based on the classification and the location of said at least one object and the controlled actuation of said displacing means.

11. The waste sorting apparatus of claim 9, wherein said displacing means include at least one of:

pushing members;

a plurality of multi-axis rollers embedded in the stationary base plate;

devices configured to selectively generate a material specific displacing force field, wherein said material specific displacing force field includes one of a magnetic field, an electrostatic field and a fluidodynamic pressure field.

12. The waste sorting apparatus of claim 1, wherein said holding means include at least one of:

devices configured to selectively generate a material specific holding force field, wherein said material specific holding force field includes one of a magnetic field, an electrostatic field and a fluidodynamic pressure field;

materials configured to selectively generate an adhesion force to said at least one object.

13. The waste sorting apparatus of claim 12, wherein the materials configured to selectively generate the adhesion force to the at least one object include an electrically actuated glue.

14. The waste sorting apparatus of claim 1, wherein said object detection means are configured to classify said at least one object in one of the plurality of predetermined types of object based on a material thereof.

15. The waste sorting apparatus of claim 1, wherein said object detection means include one of optical recognition means and metal detection means.

16. The waste sorting apparatus of claim 1, further comprising motion detecting means configured for detecting an introduction of the at least an object disposed by the user in the receiving compartment and for activating said object detection means.

17. The waste sorting apparatus of claim 1, further comprising rewarding means coupled to said object detection means and configured to issue a reward to the user or drive a waging machine depending upon the classification of said at least one object in one of the plurality of predetermined types of object.

18. A method of operating a waste sorting apparatus comprising:

a receiving compartment for receiving at least one object disposed by a user;

object detection means associated with the receiving compartment and configured to classify said at least one object in one of a plurality of predetermined types of object; and sorting means associated with the receiving compartment and configured for selectively directing said at least one object to a respective one of a plurality of collecting receptacles based on the classification of said at least one object, wherein said object detection means are further configured to identify a location of said at least one object in the receiving compartment; and wherein said sorting means include holding means for holding one or more of said at least one object in the receiving compartment when selectively directing one or more other of said at least one object to a respective collecting receptacle, in case multiple objects of different types are detected in the receiving compartment, the method comprising:

detecting an introduction of the at least an object disposed by the user in the receiving compartment;

activating the object detection means;

identifying the location of said at least one object in the receiving compartment;

classifying said at least one object in the respective one of the plurality of predetermined types of object; and selectively directing said at least one object to the respective one of the plurality of collecting receptacles based on the classification of said at least one object by holding one or more other of said at least one object in the receiving compartment when selectively directing one or more other of said at least one object to the respective collecting receptacle, in case multiple objects of different types are detected in the receiving compartment.

* * * * *